United States Patent [19]

Overholt

[11] Patent Number: 5,233,780
[45] Date of Patent: Aug. 10, 1993

[54] REMOTELY CONTROLLED DECOY AND METHOD

[76] Inventor: Dallas L. Overholt, Route 1, Box 171, Honea Path, S.C. 29654

[21] Appl. No.: 874,200

[22] Filed: Apr. 24, 1992

[51] Int. Cl.⁵ ............................................. A01M 31/06
[52] U.S. Cl. .................................................. 43/2; 43/3
[58] Field of Search .................... 43/3, 2, 1; 446/236, 446/297, 397; 40/414

[56] References Cited

U.S. PATENT DOCUMENTS

| | | | |
|---|---|---|---|
| 2,227,242 | 12/1940 | Boutin | 43/3 |
| 2,443,040 | 6/1948 | Jones | 43/3 |
| 2,747,314 | 5/1956 | McGregor | 43/3 |
| 2,835,064 | 5/1958 | Webb | 43/3 |
| 2,849,823 | 9/1958 | Miller | 43/3 |
| 3,689,927 | 9/1972 | Boston | 43/3 |
| 4,862,625 | 9/1989 | Dolan | 446/397 |
| 5,029,408 | 7/1991 | Smith | 43/1 |
| 5,036,614 | 8/1991 | Jackson | 43/3 |

Primary Examiner—Mark Rosenbaum
Assistant Examiner—Jeanne M. Elpel
Attorney, Agent, or Firm—Ralph Bailey

[57] ABSTRACT

A decoy has means giving both radio controlled auditory and visual signals including movement for attracting game.

13 Claims, 2 Drawing Sheets

REMOTELY CONTROLLED DECOY AND METHOD

BACKGROUND OF THE INVENTION

This invention relates to remotely controlled decoys and method especially useful by turkey hunters.

Wild turkeys are among the most difficult of all animals to be successfully hunted. Wild turkeys have especially good eye sight encompassing a wide angle of vision and are especially sensitive to movement. Any sound or movement has been found to produce rapid flight of any wild turkey which is a prospect for the hunter. Moreover, turkey calls are generally of the mechanical type wherein a sound is produced by friction resulting from moving one selected member against another. When sound is produced in this fashion, and the hunter concealed as in wild growth or bushes and the like, the hunter is not visible to another hunter who may shoot at the sound of the call resulting in a safety hazard.

Heretofore, efforts have been made to produce radio controls for decoys, as for example, U.S. Pat. No. 3,689,927, which illustrates details for propelling and guiding water fowl decoys. U.S. Pat. No. 5,036,614 illustrates a remotely controlled turkey for imparting movement. U.S. Pat. No. 2,227,242 illustrates a remotely controlled decoy having a call. The following U.S. Pat. Nos. further illustrate the state-of-the-art; 2,726,469; 2,747,314; 2,835,064; 3,079,719; 3,350,808; 3,916,553; and 4,314,423.

Accordingly, it is desirable to provide a decoy producing a remotely controlled sound so that the sound attracts birds and other hunters toward the decoy rather than the hunter.

Another important object of the invention is to provide a decoy producing visual movement and sound which is produced closely adjacent the decoy.

Another important object of the invention is to produce a decoy which may be remotely controlled for producing selected movement of the decoy together with manually controlled sound emanating adjacent the decoy.

SUMMARY OF THE INVENTION

It has been found that a remotely controlled decoy may be provided which is radio controlled in response to separate controls for respectively producing sound and movement in the decoy. A base or stand is provided for containing mechanical sound or call producing apparatus and for supporting the decoy for imparting movement. The decoy may preferably take the form of a turkey but other animals, for example, may be emulated such as geese or ducks.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A remotely controlled decoy apparatus includes a decoy body A which is illustrated in the form of a wild turkey. Mechanical means B which includes a first servo mechanism D and a sleeve imparts movement to the decoy body. Means C, producing a call characteristic of the animal represented by the decoy, is carried adjacent the decoy body and includes a second servo mechanism E, a lever, a plunger, and a call box. Radio transmitter G and receiving means F are provided. Thus, the decoy may attract game through both movable and audible calls. The elements referred to above are included in a base support for carrying the decoy body A.

A radio controlled mechanism suitable for operating devices according to the invention may include components manufactured by Futaba under the designation MAGNUM SPORT FP-T2PB DIGITAL PROPORTIONAL RADIO CONTROL SYSTEM. The transmitting component for the device is broadly illustrated at G in FIG. 1.

Figure 1:
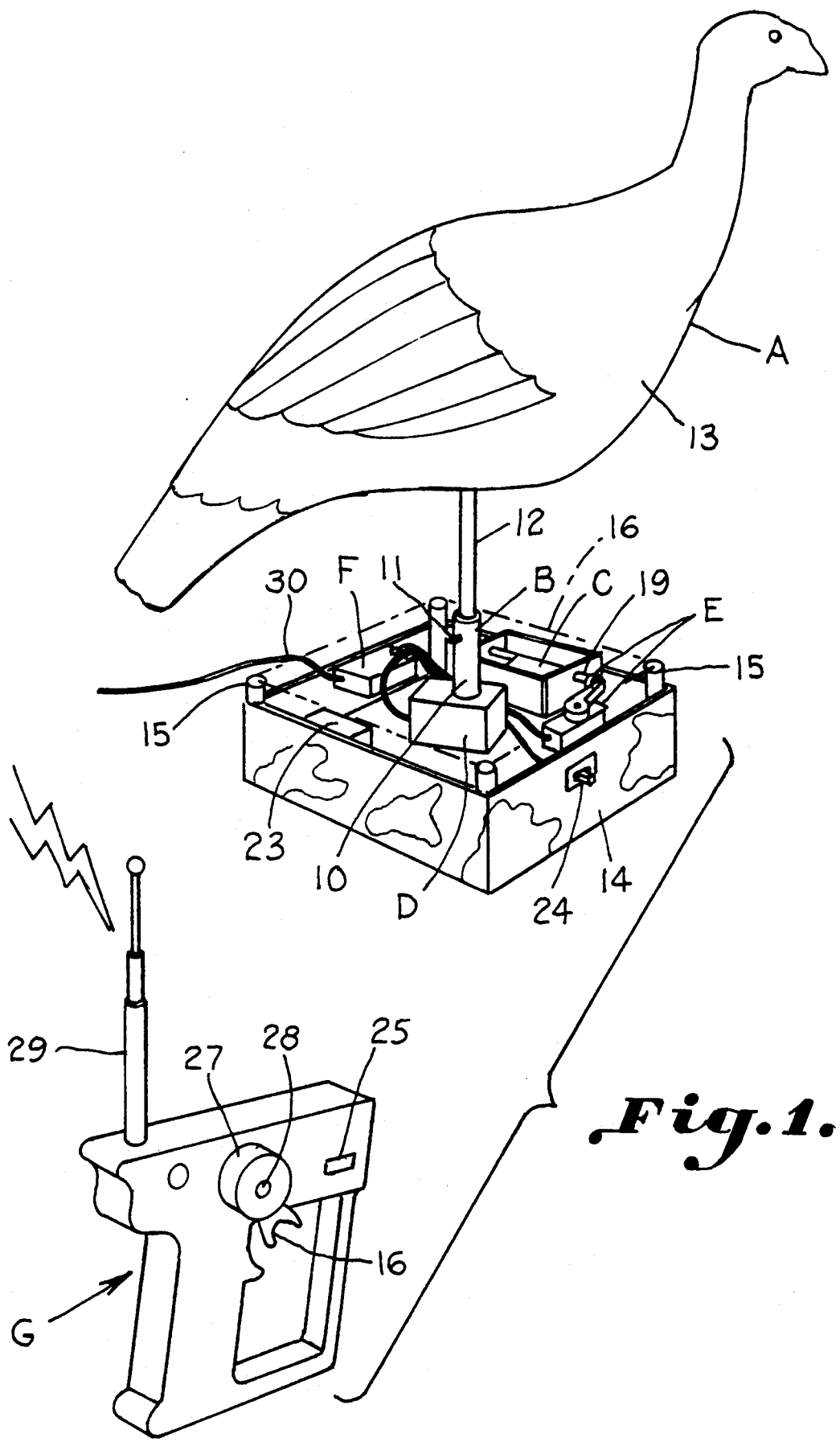
FIG. 1 is a perspective view illustrating a turkey decoy utilizing a radio transmitter with receiving and operating mechanism for providing movement and sound to the decoy constructed in accordance with the invention.
Figure 2:
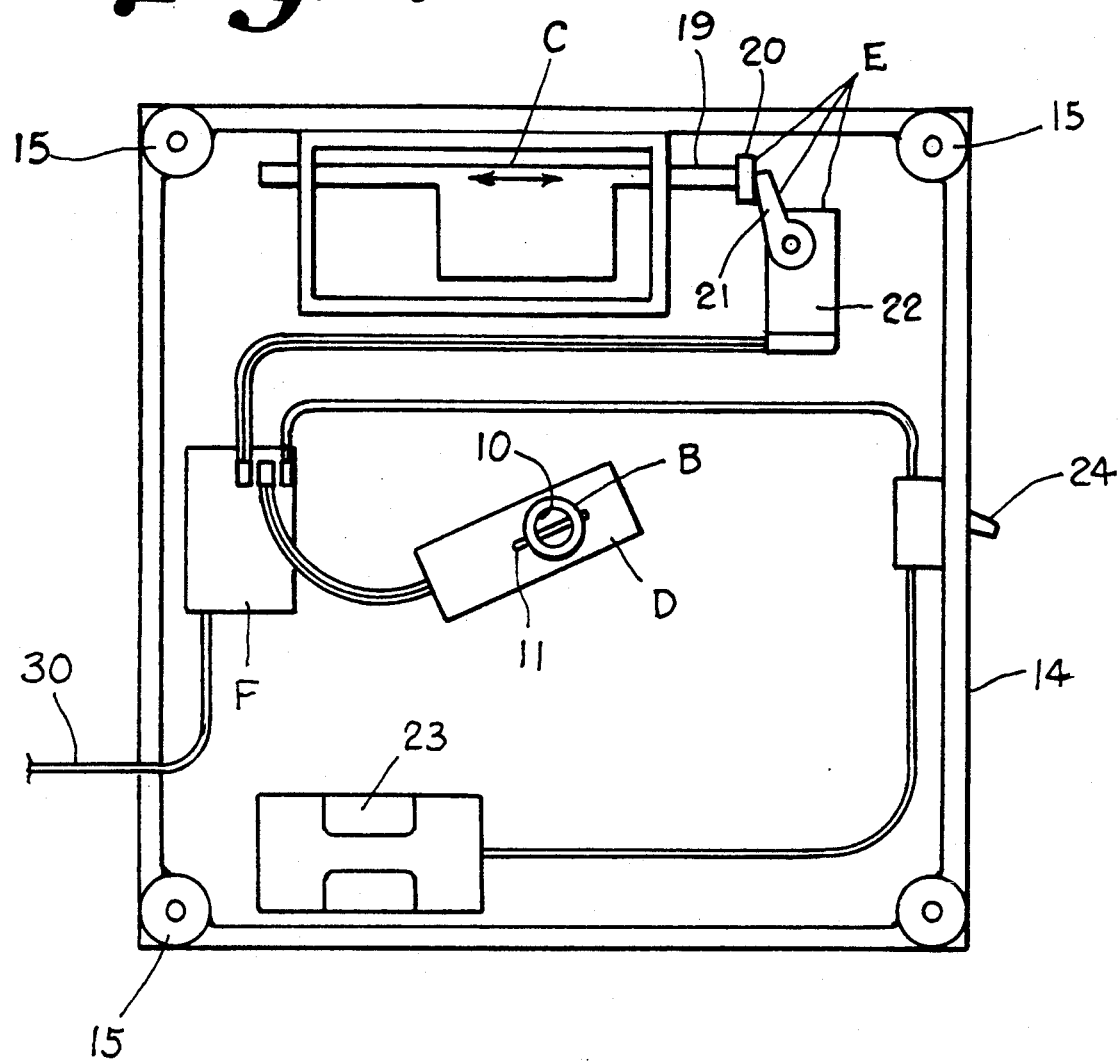
FIG. 2 is a plan view with top cover removed illustrating the base support box constructed in accordance with the invention.
Figure 3:
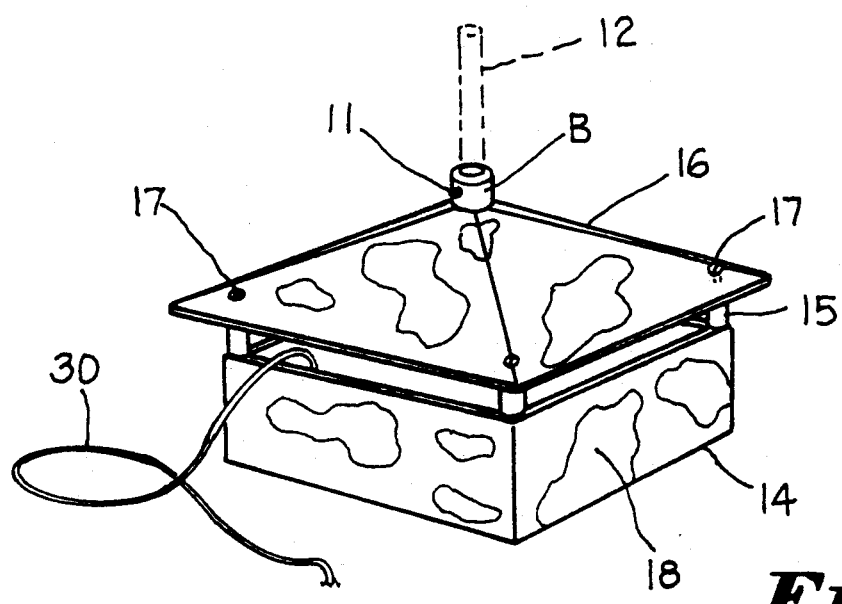
FIG. 3 is a perspective view illustrating the base constructed in accordance with the invention with cover in place for receiving a decoy.

Referring more particularly to FIG. 1, it is observed that the invention contemplates a base support which includes mechanical means B for receiving and imparting mechanical movement to the decoy body A. The mechanical means B includes a hollow sleeve 10 which is driven for rotational movement by the first servo mechanism D. The sleeve has openings for accommodating a cross pin 11 to fix a vertical support 12 which carries the body 13 of the turkey A. The servo mechanisms are carried in a box 14 which serves as a container for the various components hereof forming the base support. A vertical mounting member 15 is carried in each corner of the box 14, and these carry a cover or lid 16 best shown in FIG. 3. Suitable fastening screws 17 are provided to secure the cover upon the mounting supports 15. The box and cover are preferably provided with camouflage paint 18 so as to better blend with the brush or environment in which the decoy is employed.

The call actuating means C is preferably of the mechanical variety rather than a reed-type call. The mechanical call may be operated by a plunger 19 which causes two members to engage frictionally producing the characteristic call as of a turkey or other game. Such calls are known as "box" calls. The plunger has an enlarged end member or follower 20 for engagement by the lever 21 pivotally operated by the second servo mechanism E.

A dual receiver is illustrated at F for operating both servo mechanisms. The various mechanisms are suitably operated by the battery pack 23. A mechanical switch operator 24 actuates a switch for providing power to the system referred to above and is contained within the base support. The radio transmitter G includes a power switch having an operator 25. An additional switching mechanism members include the trigger operating mechanism 26 actuating the call in any desired sequence. A rotatable means 27 acts as a switch operating member for controlling the first servo mechanism D. It should be noted that there is no return spring in the rotatable member 27 so that the mechanism leaves the bird in any predetermined position without being automatically returned. The rotatable mechanism 27 is carried upon a shaft 28. The transmitter mechanism includes a suitable antenna 29. In this connection it should ne noted that the antenna 29 communicates with a suitable antenna 30 carried by the receiver F.

While a preferred embodiment of the invention has been described using specific terms, such description is for illustrative purposes only, and it is to be understood that changes and variations may be made without departing from the spirit or scope of the following claims.

What is claimed is:

1. A remotely controlled decoy attracting game on land comprising:
   a decoy body;
   mechanical means imparting non-translatory movement to said decoy body including a first servo mechanism and a sleeve driven by said first servo mechanism;
   means producing a call characteristic of said decoy carried adjacent said decoy body.
   movement actuating means actuating said mechanical means; and
   call actuating means actuating said means producing a call;
   whereby said decoy may attract game through both movement and audible calls.

2. The structure set forth in claim 1 wherein said means producing a call is a mechanical apparatus.

3. The structure set forth in claim 2 wherein said means producing a call includes a second servo mechanism and a plunger causing members to engage frictionally to produce a call when said plunger is pushed by a lever pivotally driven by said second servo mechanism.

4. The structure set forth in claim 3 wherein said movement actuating means includes a receiving means actuating said mechanical means upon receiving a first signal emitted by a radio transmitter.

5. The structure set forth in claim 4 wherein said call actuating means includes said receiving means actuating said means producing a call upon receiving a second signal emitted by said radio transmitter.

6. The structure set forth in claim 5 wherein said radio transmitter has a first control mechanism for emitting said first signal and a second control mechanism for emitting said second signal.

7. The structure set forth in claim 6 wherein said first control mechanism can vary said first signal and said second control mechanism can vary said second signal, providing different decoy body positions and sounds to attract said game.

8. The structure set forth in claim 5 wherein said radio transmitter has a control actuating said first servo mechanism for controlling mechanical movement wherein cessation of movement may occur with parts in a selected position.

9. The structure set forth in claim 5 wherein said radio transmitter may control the sequence of operation of said first and second servo mechanisms.

10. The structure set forth in claim 1 wherein said decoy is a turkey decoy.

11. The structure set forth in claim 1 further comprising a base support for said decoy body carrying said mechanical means and said means producing a call.

12. The method of attracting game utilizing a remotely controlled decoy having mechanical means producing movement and a means producing sound responsive to a radio controlled transmitter comprising the steps of:
   actuating said mechanical means and said means producing sound independently of each other;
   deactivating said mechanical means to leave the decoy in a selected position; and
   actuating said means producing sound in a variable sequence.

13. The structure set forth in claim 1 wherein said sleeve is hollow and driven by said first servo mechanism for rotational movement.

* * * * *